(12) United States Patent
Mans et al.

(10) Patent No.: US 9,400,216 B2
(45) Date of Patent: Jul. 26, 2016

(54) DETECTOR

(71) Applicant: C.P. Electronics Limited, London, Greater London (GB)

(72) Inventors: Paul Mans, Harpenden (GB); Merlin Milner, Lewes (GB)

(73) Assignee: C.P. Electronics Limited, London (GB)

(*) Notice: Subject to any disclaimer, the term of this patent is extended or adjusted under 35 U.S.C. 154(b) by 0 days.

(21) Appl. No.: 14/373,474

(22) PCT Filed: Jan. 21, 2013

(86) PCT No.: PCT/GB2013/050132
§ 371 (c)(1),
(2) Date: Jul. 21, 2014

(87) PCT Pub. No.: WO2013/108052
PCT Pub. Date: Jul. 25, 2013

(65) Prior Publication Data
US 2015/0008325 A1    Jan. 8, 2015

(30) Foreign Application Priority Data
Jan. 20, 2012 (GB) .................................. 1201002.1

(51) Int. Cl.
*G01J 5/00* (2006.01)
*G01J 5/04* (2006.01)
*G08B 13/19* (2006.01)

(52) U.S. Cl.
CPC ............... *G01J 5/0025* (2013.01); *G01J 5/047* (2013.01); *G08B 13/19* (2013.01)

(58) Field of Classification Search
CPC .......... G01J 5/0025; G01J 5/047; G08B 13/19
See application file for complete search history.

(56) References Cited

U.S. PATENT DOCUMENTS

| 6,091,200 | A | 7/2000 | Lenz |
| 7,490,960 | B1 | 2/2009 | Fiorino et al. |
| 2005/0152144 | A1 | 7/2005 | Nash |
| 2005/0200495 | A1* | 9/2005 | Sibalich et al. .......... 340/693.11 |
| 2005/0281021 | A1 | 12/2005 | Thompson |
| 2008/0259599 | A1 | 10/2008 | Fowler et al. |
| 2008/0302929 | A1 | 12/2008 | Laso et al. |
| 2009/0059607 | A1 | 3/2009 | Yoon |
| 2009/0141499 | A1 | 6/2009 | Fabbri et al. |

FOREIGN PATENT DOCUMENTS

| CN | 2445388 Y | 8/2001 |
| CN | 200968525 Y | 10/2007 |
| CN | 101640960 A | 2/2010 |
| DE | 10 2005 047496 A1 | 4/2007 |

(Continued)

OTHER PUBLICATIONS

International Search Report for corresponding patent application No. PCT/GB2013/050132 dated Apr. 8, 2013.

(Continued)

*Primary Examiner* — Mark R Gaworecki
(74) *Attorney, Agent, or Firm* — Renner, Otto, Boisselle & Sklar, LLP

(57) ABSTRACT

Embodiments of the present invention relate to a detector (100) suitable for attaching to a light fitting. The detector comprises a passive infra red sensor (102) and a clip (128) suitable for suspending the detector from a light fitting.

8 Claims, 2 Drawing Sheets

(56) References Cited

FOREIGN PATENT DOCUMENTS

| | | |
|---|---|---|
| JP | 2003317537 A | 5/2003 |
| JP | 2005158461 A | 6/2005 |
| WO | 2010/067089 A2 | 6/2010 |
| WO | 2011/124400 A2 | 10/2011 |

OTHER PUBLICATIONS

Combined Search and Examination Report for corresponding Application No. GB1201002.1 dated Apr. 27, 2012.
Office Action for corresponding Chinese Patent Application No. 201380006171.9 dated Sep. 21, 2015.

* cited by examiner

DETECTOR

This application is a national phase of International Application No. PCT/GB2013/050132 filed Jan. 21, 2013 and published in the English language.

FIELD OF THE INVENTION

This invention relates to a detector, and in particular to a presence detector that is suitable for mounting to an existing light fitting.

BACKGROUND TO THE INVENTION

Lighting unoccupied spaces such as rooms and corridors is a major source of wasted energy in many commercial and residential buildings. Even where convenient switches are provided to deactivate unused lights, the occupants of a building may not remember to turn the lights off, or may not choose to do so. In addition, for safety reasons, it is often desirable that the lighting in a room should be activated automatically whenever that room is occupied.

One known solution for this problem is to use presence detectors, such as passive infra red sensors, to automatically activate and deactivate lighting systems as required. For example, a hallway may be provided with a presence detector which activates the lights whenever a person steps into the hallway. Once the hallway is again unoccupied, the presence detector will deactivate the lights to save power.

However such detectors are typically installed as part of a complete lighting system. The presence detector is typically installed in a recess in the wall or ceiling at the same time as the light fittings (luminaires) are installed and connected to the lighting controller for the lighting system. Such presence detectors are also difficult to move once installed, meaning that if there is a change in the layout of a room, the presence detectors may be rendered useless until they are reinstalled elsewhere, at considerable cost of time and effort.

In view of the above, presence detectors which can be installed in a pre-existing lighting system and are easily movable would be desirable.

SUMMARY OF THE INVENTION

According to the present invention, there is provided a detector comprising a passive infra-red sensor configured to detect the presence of a person within the detection field of the sensor and a clip configured to attach the detector to an existing light fitting with the sensor arranged such that its detection field covers at least partially the area illuminated by the light fitting. The clip comprises an elongate member having a distal end and a proximal end. The clip further comprises at least one opposing member mounted at the distal end of the elongate member. The opposing member(s) is arranged to clamp a portion of a light fitting between the elongate member and the opposing member(s). In the presently preferred embodiment two opposing members are provided.

In this way the invention provides an easily installable and easily movable detector. As the detector is provided with a clip, installation is simply a matter of clipping it onto a suitable vantage point, such as a louvre light fitting.

Typically, the detector is used to switch a light fitting on and off directly using a wired connection. Alternatively, the detector may be connected to a separate lighting controller by a wired connection. As a further alternative, the detector may comprise a wireless transmitter or transceiver configured for data communication with a lighting controller. In this case, the lighting controller is provided with a receiver which is capable of receiving the signal from the wireless transmitter. A lighting system can then be configured to respond automatically to changes in the environment which are detected by the sensor. However the detector may be used in combination with other systems to which a user wishes to respond automatically, such as climate control systems, or security systems.

Typically, the passive infra-red sensor is powered by an electrical connection to the lighting or control system. However, it is possible for the detector to be battery-powered.

The opposing member may take the form of a spring clip or crocodile clip. In the preferred embodiment, however, the opposing member extends from the distal end of the elongate member towards the proximal end thereof. Thus, the opposing member may take the form of a hook. The opposing member may be connected to the elongate member by a transverse member. The transverse member may provide spacing between the elongate member and the opposed member. The transverse member may be arranged to engage an upper edge of a portion of a light fitting, in use. In this way, the weight of the detector can be borne by the transverse member and the light fitting.

Desirably, the opposing member is resiliently biased towards the elongate member. This ensures a firm grip of the clip on the light fitting. Conveniently, the opposing member is formed of resilient material, such as plastics. The elongate member, transverse member and opposing member(s) may be formed of a single plastics moulding.

The sensor may be provided within a housing. The housing may be mounted to the elongate member on the opposite side thereof to the opposing member. In this way, the weight of the housing acts against the opposing member increasing the stability of the detector in the position of use.

The housing may be pivotally mounted to the elongate member about an axis transverse to the longitudinal direction of the elongate member. In this way, the sensor can be directed to cover the required field of detection.

The housing may be slidably mounted relative to the elongate member. This allows the housing to be positioned at the appropriate location relative to the light fitting. A brake may be provided for resisting relative sliding movement of the housing and elongate member. The brake may be simply a friction fit of the connection between the housing and the elongate member. Alternatively, a locking mechanism may be provided. In the preferred embodiment, the brake comprises a rack and pawl.

According to the invention, the sensor comprises a passive infrared sensor. However, other sensors may be used, such as a microwave sensor. In addition, the detector may comprise a light level sensor. The detector may comprise a microprocessor for processing output signals from the sensor(s). The detector may comprise a wireless receiver for receiving control signals from the lighting controller.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

An embodiment of the present invention will now be described with reference to the Figures.

A detector 100 according to an embodiment of the invention comprises a passive infrared (PIR) sensor 102. In use, when the PIR sensor 102 detects a change in the received infrared signal indicative of a person in the detection field of the sensor, the PIR sensor outputs a signal to a lighting controller (not shown). In response to the received signal the lighting controller can operate in accordance with a pre-programmed regime to illuminate the lights in the vicinity of the detector 100.

Figure 1:
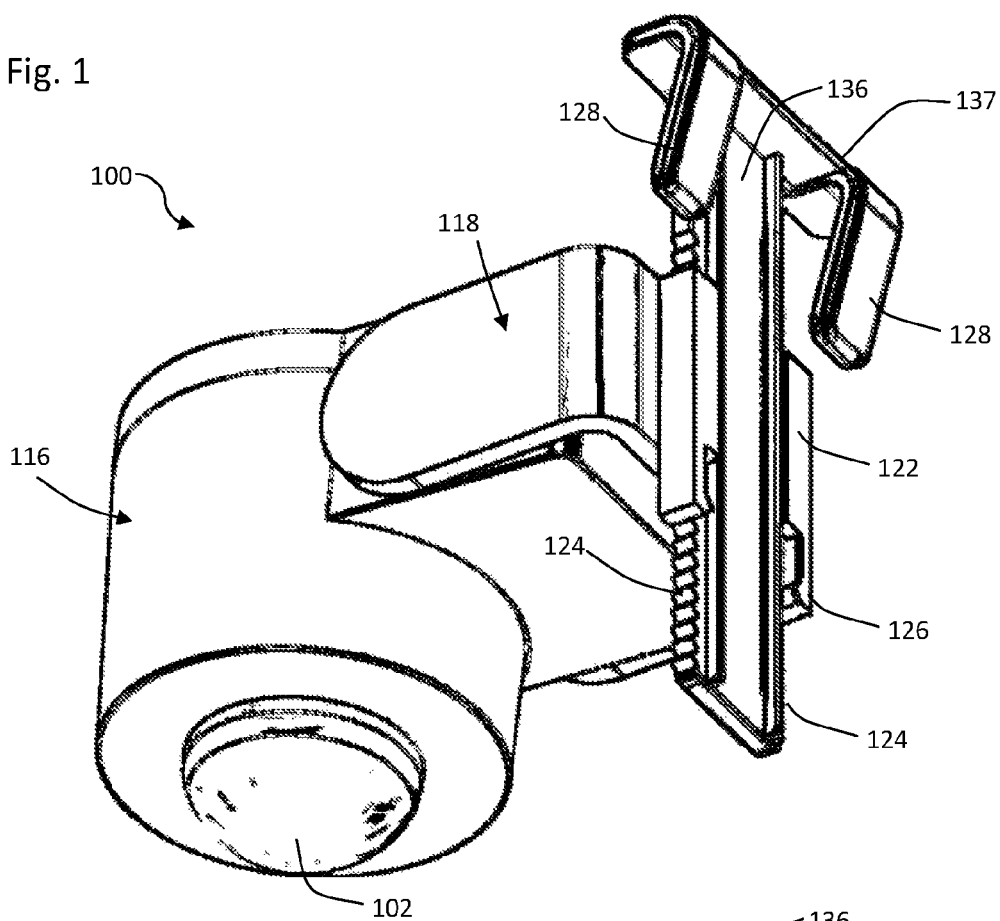
FIGS. 1 and 2 are perspective views of the detector of a detector according to an embodiment of the invention.
Figure 2:
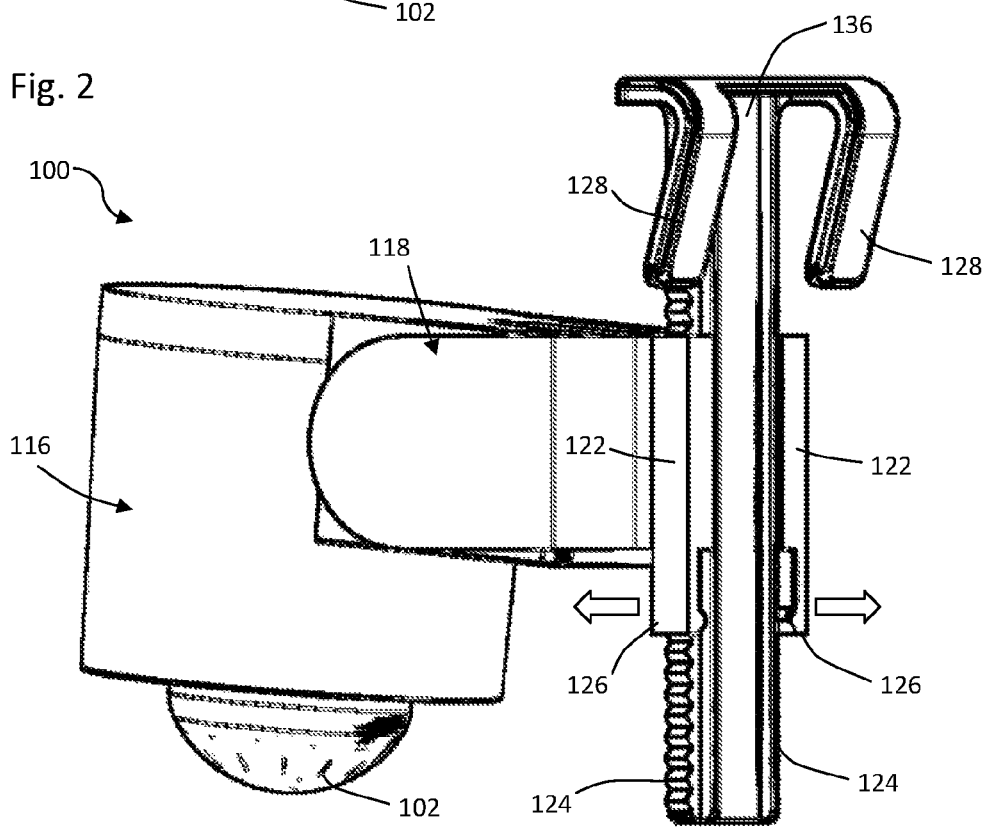

FIG. 1 and FIG. 2 are perspective views of the detector 100, in which the PIR sensor 102 can be seen. Turning to FIGS. 1 and 2, the detector 100 comprises a main housing 116 which houses the PIR sensor 102 and any other electronic components. The main housing 116 is pivotally mounted to a bracket 118, such that the main housing 116 can be rotated with respect to the support member 118 about an axis transverse to the axis of the PIR sensor 102.

The bracket 118 is slidably mounted to an elongate member 136. The bracket 118 comprises a first and second jaw 122 which embrace the edges of the elongate member 136 and slidably attach the bracket 118 to the elongate member 136. The longitudinal edges of the elongate member 136 are each provided with a respective toothed rack 124, and each jaw 122 of the bracket 118 comprises a pawl 126, which engages a respective rack 124 to prevent the bracket 118 from sliding relative to the elongate member 136.

In order to adjust the position of the bracket 118, and thus the housing 116, with respect to the elongate member 136, the pawls 126 are moved outwardly, as indicated by the arrows in FIG. 2. This causes the jaws 122 to elastically deform so that the pawls 126 are lifted free of the racks 124. The bracket 118 can then be slid up and down the elongate member 136 as desired, until the pawls 126 are released and so re-engage the racks 124, locking the bracket in place with respect to the elongate member. This can be achieved with hand force from a user, but the weight of the assembled housing is insufficient to cause movement of the bracket 118 relative to the elongate member when the pawls 126 engage the racks 124.

At its distal end, the elongate member 136 is provided with two opposing members in the form of first and second hooks 128. The hooks 128 are connected to the elongate member 136 by a transverse member 137 and extend therefrom towards the proximal end of the elongate member 136. The hooks 128 are formed of resilient material and are angled towards the elongate member at their proximal ends. In this way, when a portion of a light fitting is interposed between the hooks 128 and the elongate member 136, the hooks 128 act to urge the elongate member 136 against the light fitting to secure the detector in position. The weight of the assembled housing 116 acts via the elongate member 136 against the resilience of the hooks 128 to provide a stable location of the detector.

Figure 3:
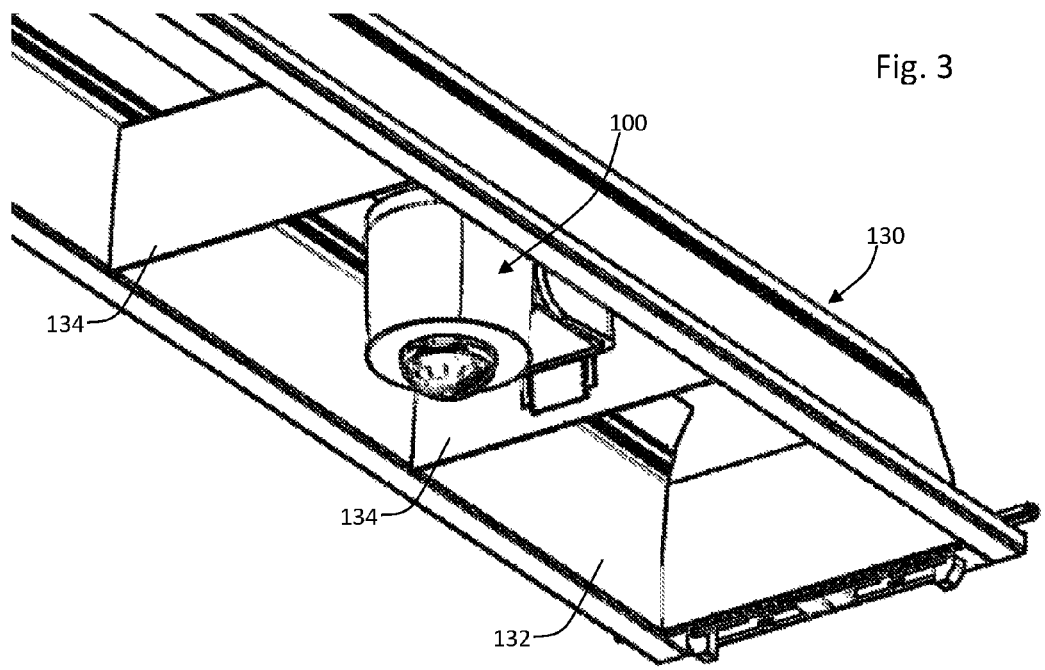
FIGS. 3 and 4 are illustrations of the detector of FIGS. 1 and 2 in use.

FIG. 3 shows the detector 100 attached to a linear fluorescent louvre 130. The louvre 130 comprises a fluorescent strip light and a housing for that fluorescent strip light. The housing comprises curved side pieces 132 and cross pieces 134. The curved side pieces 132 and the cross pieces 134 are typically made out of a reflective material, so that light from the fluorescent strip light is reflected downwards instead of being absorbed and scattered by the ceiling above. The detector 100 can be attached to the louvre 130 by placing the hooks 128 over the cross pieces 134. The elongate member 136 then rests against the cross piece 134, and the PIR sensor 102 is afforded a clear view below the louvre 130. The transverse member 137 engages the upper edge of the cross piece 134. Precisely where the PIR sensor 102 is directed can be adjusted by rotating the housing 116 with respect to the bracket 118 and sliding the bracket 118 with respect to the elongate member 136.

In the embodiment shown in FIG. 3, the lighting controller 112 is arranged to control the louvre 130, such that when a person walks underneath the louvre 130 they are detected by the PIR sensor 102 and an activation signal is sent which causes the lighting controller 112 to activate the fluorescent strip light, providing the person with light.

The end of each hook 128 is nearly flush with the body 136 of the retaining member 120, in order to provide a close and consequently secure fit for the retaining member 120 when it is attached to a thin object such as the cross piece 134. The hooks 128 are also curved and capable of elastic deformation, such that a wider object can be inserted between the hooks 128 and the body 136 by deforming the hooks so that they straighten to allow the wider object's passage.

Figure 4:
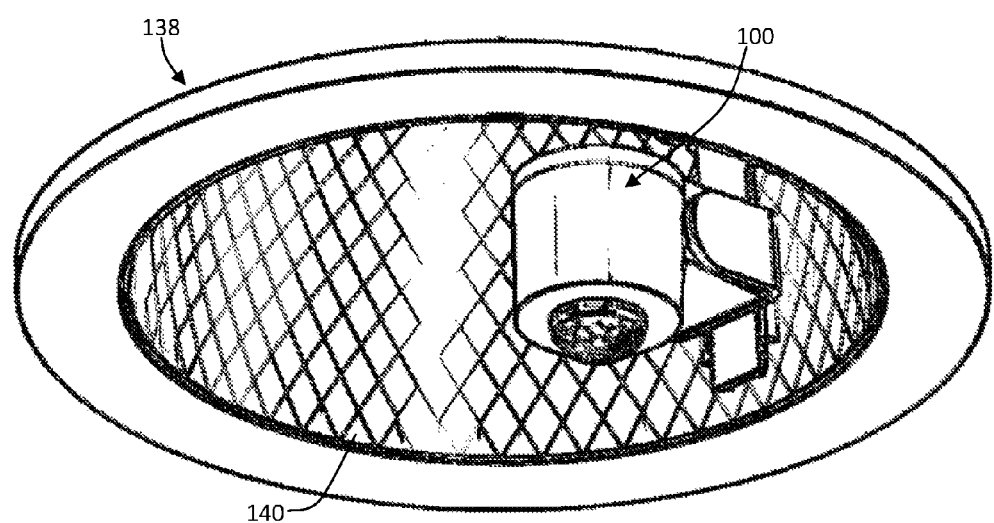

FIG. 4 shows the detector 100 attached to a compact fluorescent reflector 138. The reflector 138 comprises a reflective concave surface 140, which again directs the light of a compact fluorescent light downwards. The detector 100 can be hooked to the edge of the reflective concave surface 140.

In the embodiment shown in FIG. 4, the lighting controller is arranged to activate both the compact fluorescent light in the reflector 138, and a plurality of other similar lights nearby, in response to an activation signal from the detector 100. Therefore, when a person is detected passing underneath the reflector 138, a large area is automatically illuminated.

In summary, embodiments of the present invention relate to a detector (100) suitable for attaching to a light fitting. The detector comprises a passive infra red sensor (102) and a clip (128) suitable for suspending the detector from a light fitting.

The invention claimed is:

1. A detector comprising:
   a passive infra-red sensor configured to detect the presence of a person within the detection field of the sensor; and
   a clip configured to attach the detector to an existing light fitting with the sensor arranged such that its detection field covers at least partially the area illuminated by the light fitting, wherein the clip comprises an elongate member having a distal end and a proximal end, the clip further comprising at least one opposing member mounted at the distal end of the elongate member and arranged to clamp a portion of a light fitting between the elongate member and the opposing member;
   wherein the sensor is provided within a housing and the housing is mounted to the elongate member on the opposite side thereof to the opposing member; and
   wherein the housing is slidably mounted relative to the elongate member.

2. The detector as claimed in claim 1, wherein the opposing member extends from the distal end of the elongate member towards the proximal end thereof.

3. The detector as claimed in claim 2, wherein the opposing member is connected to the elongate member by a transverse member which is arranged to engage an upper edge of a portion of a light fitting, in use.

4. The detector as claimed in claim 1, wherein the opposing member is resiliently biased towards the elongate member.

5. The detector as claimed in claim 1, wherein the housing is pivotally mounted to the elongate member about an axis transverse to the longitudinal direction of the elongate member.

6. The detector as claimed in claim 1, further comprising a brake for resisting relative sliding movement of the housing and elongate member.

7. The detector as claimed in claim 6, wherein the brake comprises a rack and pawl.

8. A light fitting assembly including a light fitting and the detector of claim 1 clipped to the light fitting such that the detection field of the detector covers at least partially the area illuminated by the light fitting.

\* \* \* \* \*